United States Patent Office 3,740,373
Patented June 19, 1973

3,740,373
EPOXY RESIN COMPOSITION CONTAINING A POLYOXYALKYLENEPOLYAMINE, SUBSTITUTED PIPERAZINE, SALICYLIC ACID AND A PHENOL
Floyd Edward Bentley and Norman Bell Godfrey, Austin, Tex., assignors to Jefferson Chemical Company, Inc., Houston, Tex.
No Drawing. Filed July 28, 1971, Ser. No. 166,994
Int. Cl. C08g 30/14
U.S. Cl. 260—47 EC           13 Claims

ABSTRACT OF THE DISCLOSURE

A self-curable epoxy resin composition is provided that contains a polyepoxide resin and an accelerator-hardener composition containing a polyoxyalkylenepolyamine, N-(3-aminopropyl)piperazine, salicylic acid and a phenol additive. Use of the accelerator-hardener composition provides unexpectedly rapid cures of epoxy resins, even at low temperature, and epoxy resins cured with the accelerator-hardener composition demonstrate exceptional properties.

---

This invention broadly relates to the cure of epoxy resins. In one aspect this invention relates to a process for curing epoxy resins. In another aspect this invention relates to an accelerator-hardener curing composition for setting epoxy resins. A further aspect of our invention relates to a curable epoxy resin composition and to cured products produced therefrom which are characterized by their excellent physical properties, such as tensile strength and impact resistance.

Polyepoxide compositions generally contain various curing agents and accelerators that cure or set the curable epoxy resin composition to a thermoset resin of myriad uses.

Curing aids of general importance to our invention include the polyoxyalkylenepolyamines, such as are representatively described in U.S. Pat. Nos. 3,236,895 and 3,462,393. These patents relate to polyoxyalkylenepolyamines and to the curing of polyepoxide resins with polyoxypropylenepolyamines, respectively.

The development and use of polyoxyalkylenepolyamines as curing agents for epoxy resins was a definite advancement in the art. Epoxy resins cured with these compositions generally exhibit certain desirable physical properties including the characteristics of structural and tensile strength which make for a more useful and valuable epoxy resin.

The use of N-(aminoalkyl)piperazines for curing polyepoxides is also known such as is representatively described in U.S. Pat. No. 2,965,609. Likewise, Lee, Henry and Nevile, Chris in Handbook of Epoxy Resins, McGraw-Hill Book Company, New York, 1967, at pages 10 and 11, describe the use of salicylic acid as an accelerator for an epoxy/imidazoline blend. Further, the use of activated phenols as additives for curing epoxy resins is representatively described in U.S. Pat. No. 3,366,600. U.S. Pat. No. 2,974,121 describes certain phenols that can be used with selected amine curing agents.

In spite of the above knowledge, prior art epoxy curing systems have not proved entirely satisfactory during actual use.

Exemplary of this fact is the case of curing with the hereinbefore stated polyoxyalkylenepolyamines. Although the favorable properties of the cured epoxy resin that are attributed to the use of polyoxyalkylenepolyamine curing agents may have brought these compounds wide acceptance, there remains the disappointing fact that curing epoxy resins with polyoxyalkylenepolyamines, especially when applied in thin layers, such as in floor coverings and the like, is inconveniently slow, particularly at ambient temperatures.

Quite naturally, the favorable attributes contributed to the epoxy resin by the use of polyoxyalkylenepolyamine curing agents are desired, but often it is of equal importance, and sometimes critical, to have a curing system that is rapid and effective at ambient temperatures and below.

In a related invention, U.S. patent application Ser. No. 93,431, filed Nov. 27, 1970, and entitled "Epoxy Curing," we describe another of our discoveries wherein the curing of epoxy resins with polyoxyalkylenepolyamines can be accelerated by using a synergistic mixture of N-(3-aminopropyl)piperazine and salicylic acid. Although the curing aid composition of polyoxyalkylenepolyamines, N-(3-aminopropyl)piperazine and salicylic acid, as therein disclosed, is an excellent curing and accelerating composition for epoxy resins, we have found that it is less effective at lower temperatures than we would desire.

Accordingly, in many applications it would be extremely desirable to have a self-curable epoxy resin composition that cures in a relatively short time at ambient temperatures down to 40° F. and lower, such as those approaching the freezing point, i.e., 32° F.

It was with great surprise that we discovered that a curable epoxy resin admixed with an accelerator-hardener composition containing polyoxyalkylenepolyamines, N-(3-aminopropyl)piperazine, salicylic acid and a phenol additive, provided a method for rapidly curing the epoxy resins, even at low temperatures such as those approaching the freezing point. Further, epoxy resins cured with our accelerator-hardener composition surprisingly demonstrated exceptional physical properties.

Our discovery was particularly surprising and unexpected since it was found that the use of the phenol additives with the polyoxyalkylenepolyamine curing agents alone often led to a cured resin which was less than desirable from the standpoint of its properties of hardness, tensile strength, impact resistance and softening by heat. Yet, when the phenol addition was employed in combination with the polyoxyalkylenepolyamine, N-(3-aminopropyl)piperazine and salicylic acid, according to our invention, the above-mentioned desired properties were not sacrificed. Our discovery thus allows the phenol additive to be advantageously employed.

Even more surprising was our discovery that the accelerator-hardener composition provided an even greater improvement in the rate of cure of an epoxy resin than could be predicted from the curing rates of the individual components. Additionally, the great unexpected improvements in the rate of the epoxy cure could be obtained even at low temperatures.

In addition to the foregoing discoveries, we also found a surprising method for even further accelerating the cure of epoxy resins when using our above-mentioned accelerator-hardener composition.

Accordingly, although we found that the polyoxyalkylenepolyamines, the N-(3-aminopropyl)piperazine, the salicylic acid and the phenol additive could be blended together to form a homogeneous and stable accelerator-hardener composition, which could be easily handled and used, we could, by first premixing the phenol additive with the normally liquid epoxy resin and then admixing the remaining accelerator-hardener components achieve an even greater acceleration of the epoxy cure.

In accordance with our invention, a self-curable polyepoxy resin composition containing a conventional epoxy resin, such as the polyglycidyl ethers of polyhydric phenols, is provided that can be cured at ambient temperatures and temperatures approaching the freezing point. Epoxy resins in general may be used in the present invention. Illustrative are the polyglycidyl ethers of mononuclear polyhydric phenols or polynuclear polyhydric phenols. Particularly desirable for purposes of this invention are the polyglycidyl ethers of the bis(hydroxyphenyl) alkanes. Exemplary are the diglycidyl ethers of 2,2-bis-(p-hydroxyphenyl)propane and the diglycidyl ethers of bis(p-hydroxyphenyl)methane. Other suitable epoxy resins are enumerated in U.S. Pat. No. 3,380,881 and in "Epoxy Resins" Report No. 38, The Stanford Research Institute, June 1968, which references are herein incorporated by reference thereto. The epoxy resins have an epoxy equivalency of greater than one.

In addition to the epoxy resin, the self-curable epoxy resin composition of our invention comprises a polyoxyalkylenepolyamine, salicylic acid, N-(3-aminopropyl) piperazine and a phenol additive.

Some suitable polyoxyalkylenepolyamines are representatively depicted in U.S. Pat. No. 3,236,895. Some preferred polyoxyalkylenepolyamines employable in our invention can be representatively depicted by the following formulas:

(I)

wherein each R radical is independently selected from hydrogen and $C_1$ to $C_6$ alkyls and wherein $x$ is an integer from about 2 to 40. Other diamines that are particularly suitable for use in our invention can be even further described by the following more specific formula:

(II)
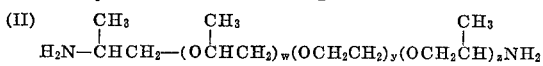

wherein $w+z$ is an integer from about 2 to 10 and $y$ is an integer from about 1 to 100; and polyoxyalkylenetriamines representatively depicted by the following formula:

(III)
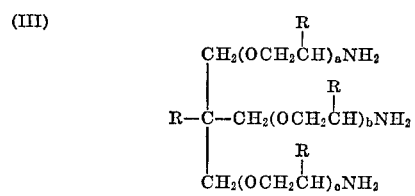

wherein each R is as previously defined and each $a$, $b$ and $c$ represents independent intergers in the range of about 1 to 15.

Exemplary phenol additives that can be employed in accordance with our invention can be representatively depicted by the following formula:

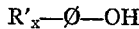

wherein each R' radical is independently selected from hydrogen, halogen, $C_1$ to $C_{20}$ alkyl or $C_1$ to $C_{20}$ alkoxy, wherein $x$ is an integer of 1 to 3 such that it represents a mono-, di- or tri-substituted phenol, respectively. R' can be a straight or branched chain radical. Exemplary phenol additives include phenol, nonylphenol, bromophenol, iodophenol, chlorophenol, hydroxyanisol, dinonylphenol, dichlorophenol, cresol, and the like.

The accelerator-hardener components of our invention can be admixed to form a homogeneous, stable liquid, free of crystals or other solids. It can therefore be conveniently stored. If desired, although not necessary nor preferred, the accelerator-hardener composition can also contain conventional diluent material such as benzene and the like.

Accordingly, the accelerator-hardener components can be premixed, if desired, and stored, or the various components comprising the self-curable epoxy resin composition can be admixed at the site of use. Although the practitioner can employ any order of mixing of the various components with the epoxy resins, it is one aspect of this invention, and a preferred aspect, that the phenol additives be individually admixed with the epoxy resin prior to the addition of the other accelerator-hardener components. Surprisingly, by admixing in this order, an even more accelerated cure is attained.

In discussing the various amounts of the individual accelerator-hardener components employed, it is convenient, in some cases, to discuss such amounts in terms of stoichiometric quantities. For purposes of stoichiometric calculations, one epoxy group is deemed to react with one amino hydrogen atom and one phenolic hydroxyl group is deemed to react with one amino nitrogen atom. Accordingly, each epoxy group, phenolic hydroxy group, each amino nitrogen and each amino hydrogen atom will be referred to as an epoxy equivalent, a hydroxyl equivalent, an amine equivalent and an amino hydrogen equivalent, respectively.

Accordingly, the N-(3-aminopropyl)piperazine and the polyoxyalkylenepolyamines are collectively employed in such an amount to provide about stoichiometric quantities of amino hydrogen equivalents per each epoxy equivalent in the epoxy resin employed. Larger and smaller quantities than the theoretical stoichiometric equivalents can, of course, be used. For example, the N-(3-aminopropyl)piperazine and polyoxyalkylenepolyamine can be collectively employed in amounts to provide from about .75 to 1.25 amino hydrogen equivalents per each epoxy equivalent provided by the epoxy resin, preferably from about .9 to 1.1 amino hydrogen equivalents per each epoxy equivalent are provided. The salicylic acid can be employed in amounts sufficient to provide about .1 to 1 part by weight salicylic acid for each part by weight of N-(3-aminopropyl)piperazine provided. Preferably, from about .2 to about .5, and more preferably about .3 to about .4, part by weight of salicylic acid per each part by weight of N-(3-aminopropyl)piperazine can be used.

The total collective amount of the salicylic acid and N-(3-aminopropyl)piperazine represents an amount sufficient to provide about .02 to .5 part by weight of salicylic acid and N-(3-aminopropyl)piperazine for each part by weight of polyoxyalkylenepolyamine provided. Preferably, about .05 to .3, and more preferably .1 to .25, part by weight of the collective amounts of salicylic acid and N-(3-aminopropyl)piperazine are provided per each part by weight of the polyoxyalkylene polyamine.

The phenol additives are employed in amounts sufficient to provide about .05 to 1.25 hydroxyl equivalents for each amine equivalent collectively provided by the N-(3-aminopropyl)piperazine and the polyoxyalkylenepolyamine. Preferably about .1 to 1 hydroxy equivalent is provided for each amine equivalent collectively provided by the N-(3-aminopropyl)piperazine and the polyoxyalkylenepolyamine.

Curing temperatures employable according to our invention can range from ambient temperatures of about 45° C. down to about the freezing point, 0° C. High temperatures can of course be employed. Post cure temperatures such as up to about 150° C. can also be employed, if desired.

The epoxy resin compositions of this invention are useful for many applications such as in preparing seamless flooring, terrazzo flooring, crushed stone aggregates, protective coatings, adhesives and castings. They are useful in potting, encapsulating, grouting, caulking and sealing compositions, and the like.

Illustrative of the foregoing discussion and description and not to be interpreted as a limitation on the scope thereof or on the materials herein employed, the following examples are presented:

EXAMPLE I

Epoxy resin compositions were formulated as reported in Table 1 at ambient temperatures of 25° C. Each composition was coated on a steel test panel by means of a 6-mil applicator blade and allowed to cure at 25° C. The times required to reach the set-to-touch and through-dry stages of the cure were determined by a Gardner circular drying time recorder and are reported in the results in Table 1.

TABLE 1

| Run No. | Formulations (parts by weight) | | | | | Results | |
|---|---|---|---|---|---|---|---|
| | DGEBA[a] | D-400[b] | APP[c] | SA[d] | Phenol additive[e] | ST[f] | TD[g] |
| 1 | 16.1 | 6.67 | 1.00 | .33 | 8 | 5.5 | 6.5 |
| 2 | 16.1 | 6.67 | 1.00 | .33 | | 8.4 | 12.5 |
| 3 | 16.1 | 8.6 | | | | 16 | 22 |
| 4 | 20.0 | 11.0 | | | 9.7 | 7 | 8 |

[a] Digycidyl ether of Bisphenol A (isopropylidenediphenol), equivalent weight per epoxide—191.
[b] Jeffamine ® product, a polyoxypropylenediamine of Formula I having an average molecular weight of about 400.
[c] N-(3-aminopropyl)piperazine.
[d] Salicylic acid.
[e] Nonylphenol.
[f] Set-to-touch time in hours, at 25° C.
[g] Through-dry time in hours, at 25° C.

The foregoing runs clearly demonstrate the synergistic effects of the accelerator-hardener components of the instant invention as illustrated by the drying times indicated.

EXAMPLE II

Curable epoxy resin compositions were formulated as reported in Table 2 by admixing them in a one-pint paint can at ambient temperatures of 25° C. The time to reach the gel stage of each cure is noted in the results as well as the times required to reach the set-to-touch and through-dry stages of a 6-mil coating on a steel test panel. Identical coatings were also kept in a refrigerator at the indicated temperature and the times required for a tack-free coating are likewise reported.

TABLE 2

| Run No. | Formulation (parts by weight) | | | | | Results | | | |
|---|---|---|---|---|---|---|---|---|---|
| | DGEBA[a] | D-230[b] | APP[c] | SA[c] | Phenol add. | Gel time,[d] minutes | ST,[e] hours | TD,[e] hours | TF,[e] days |
| 1 | 296 | 78 | 11.63 | 3.87 | [c] 64.5 | 12 | 4 | 6 | [f] 4 |
| 2 | 298 | 91 | | | [c] 65.0 | 31 | 6 | 8 | |
| 3 | 347 | 89 | 13.5 | 4.5 | | 35 | 6 | 8.3 | [f] >7 |
| 4 | 348 | 106 | | | | 188 | | | |
| 5 | 250 | 63.8 | 9.6 | 3.2 | [h] 55.2 | | 3.2 | 3.6 | [g] 2 |

[a] As reported in Table 1.
[b] Jeffamine ® product, a polyoxypropylenediamine of Formula I having an average molecular weight of about 230.
[c] As reported in Table 1.
[d] At 25° C.
[e] Tack free, days.
[f] 4° C.
[g] 9° C.
[h] Mixture m-cresol and p-cresol.

The foregoing examples effectively demonstrate the unexpected superiority of the accelerator-hardener composition of this invention and its ability to cure at low ambient temperatures.

EXAMPLE III

Curable epoxy resin compositions were formulated as indicated in Table 3. The compositions were cast between aluminum plates spaced ⅛-inch apart and allowed to cure at an ambient temperature of 25° C. In runs 1–3 the formulations were cured 13, 20 and 8 days, respectively.

TABLE 3

| Run No. | Formulations (parts by weight) | | | | | Results | | | | | |
|---|---|---|---|---|---|---|---|---|---|---|---|
| | DGEBA[a] | D-230[a] | APP[a] | SA[a] | Phenol add.[a] | Tensile strength, p.s.i.[b] | Flexural strength, p.s.i.[c] | Flexural modulus, p.s.i.[c] | Shore D hardness[d] | Elongation, percent | Deflection temp., ° C. (66 p.s.i.)[f] |
| 1 | 134 | 40.5 | | | 77 | 3,600 | 4,600 | 134,000 | 77 | [e] 59 | 33 |
| 2 | 194 | 50 | 7.5 | 2.5 | 96 | 8,360 | 13,600 | 350,000 | 83 | [e] 2.9 | 43 |
| 3 | 148 | 39 | 5.75 | 2.0 | 32 | 10,600 | 16,000 | 510,000 | 87 | [e] 3.7 | 50 |

[a] As reported in Table 2. [b] ASTM D-638. [c] ASTM D-790. [d] ASTM D-2240. [e] ASTM D-638, at break. [f] ASTM D-648.

The foregoing example effectively illustrates that epoxy resin compositions cured with the accelerator-hardener composition of this invention provide a superior resin. It also demonstrates the inferior physical properties of epoxy resins cured in the absence of the salicylic acid and N-(3-aminopropyl)piperazine components of our curing composition.

EXAMPLE IV

Curable epoxy resin compositions were formulated as indicated in Table 4 by admixing the accelerator-hardener components and then slowly adding the admixture to the epoxy resin. Drying times were determined at 25° C. and reported in the following table. The exemplary phenol additive that was employed in each formulation is reported therein.

TABLE 4

| Run No. | Formulations (parts by weight) | | | | | Results | |
|---|---|---|---|---|---|---|---|
| | DGEBA[f] | D-230[f] | APP[f] | SA[f] | Phenol add. | ST, hours[f] | TD, hours[f] |
| 1 | 58 | 15 | 2.25 | .75 | [a] 11.3 | 3.5 | 4.2 |
| 2 | 58 | 15 | 2.25 | .75 | [b] 15.5 | 2.5 | 3.7 |
| 3 | 38 | 15 | 2.25 | .75 | [c] 15 | 2.5 | 3.2 |
| 4 | 29 | 7.5 | 1.12 | .38 | [d] 21 | 5 | .7 |
| 5 | 25 | 6.38 | .96 | .32 | [e] 5.52 | 3.2 | 3.6 |

[a] Phenol.
[b] p-Chlorophenol.
[c] p-Methoxyphenol.
[d] Dinonylphenol.
[e] Mixtures of m-cresol and p-cresol.
[f] As reported in Table 2.

EXAMPLE V

Into a one-pound paint can were weighed and thoroughly stirred by hand after each addition, 261 grams of the diglycidyl ether of isopropylidenediphenol having an equivalent weight of 191, 113 grams of nonylphenol, and a mixture comprising 67.5 grams Jeffamine® D-230 product, a polyoxypropylenediamine of structure I having an average molecular weight of about 400, 10.1 grams N-(3-aminopropyl)piperazine, and 3.4 grams salicylic acid. The above composition gelled 6½ minutes after completion of the mixing, and reached a maximum exotherm temperature at the center of 187° C.

A second batch was made, comprising the identical composition as stated above, but with the epoxy resin incorporated last. This composition, however, gelled in 10½ minutes and reached a maximum exotherm temperature of 183° C.

The foregoing example effectively demonstrates the curing acceleration that is attainable by altering the order of addition of the components according to our invention.

EXAMPLE VI

An epoxy resin composition was prepared by admixing, in order, 190 grams of the same epoxy resin employed in Example V, 109 grams of nonylphenol, 152 grams Jeffamine® ED-600 product (a polyoxyalkylenetriamine of structure III having an average molecular weight of about 600), and 4 grams of a 3:1 mixture of N-(3-aminopropyl)piperazine and salicylic acid. This composition gelled in 33 minutes at 25° C. after mixing. The product was a clear light yellow flexible material. The peak temperature during curing was 170° C.

In comparison 348 parts of the epoxy resin and 106 parts of Jeffamine® ED-600 product alone failed to exhibit any exotherm and remained liquid for more than two days.

The preceding examples can be repeated with similar success by substituting the generically and specifically described reactants and conditions of this invention for those employed in the examples.

As will be evident to those skilled in the art, various modifications of this invention can be made or followed in light of the discussion and disclosure herein set forth without departing from the spirit or the scope thereof.

We claim:

1. A self-curable epoxy resin composition comprising:
   (a) a polyepoxide resin;
   (b) a polyoxyalkylenepolyamine;
   (c) N-(3-aminopropyl)piperazine;
   (d) salicylic acid; and
   (e) a phenol additive;
wherein the N-(3-aminopropyl)piperazine and the polyoxyalkylenepolyamine are collectively employed in such an amount to provide in the range of about .75 to 1.25 amino hydrogen equivalents for each epoxy equivalent provided by the epoxy resin; wherein the collective amounts of salicylic acid and N-(3-aminopropyl)piperazine are sufficient to provide in the range of about .02 to .5 part by weight for each part by weight of polyoxyalkylenepolyamine provided; wherein the salicylic acid is employed in amounts sufficient to provide in the range of about .1 to 1 part by weight salicylic acid for each part by weight N-(3-aminopropyl)piperazine; wherein the phenol additive is employed in an amount sufficient to provide in the range of about .05 to 1.25 hydroxyl equivalents for each amine equivalent collectively provided by the N-(3-aminopropyl)piperazine and the polyoxyalkylenepolyamine; and wherein said phenol additive is represented by the following formula

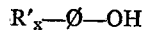

wherein each R' radical is independently selected from hydrogen, halogen, $C_1$ to $C_{20}$ alkyl or $C_1$ to $C_{20}$ alkoxy, and wherein $x$ is an integer of 1 to 3.

2. The composition according to claim 1 wherein said N-(3-aminopropyl)piperazine and said polyoxyalkylenepolyamine are collectively employed in such an amount to provide in the range of about .9 to 1.1 amino hydrogen equivalent for each epoxy equivalent provided by the epoxy resin; wherein said collective amounts of salicylic acid and N-(3-aminopropyl)piperazine are sufficient to provide in the range of about .05 to .3 part by weight for each part by weight of polyoxyalkylenepolyamine provided; wherein the salicylic acid is employed in amounts sufficient to provide in the range of about .2 to .5 part by weight salicylic acid for each part by weight of N-(3-aminopropyl)piperazine; and wherein said phenol additive is employed in an amount sufficient to provide in the range of about .1 to 1 hydroxyl equivalent for each amine equivalent collectively provided by said N-(3-aminopropyl)piperazine and said polyoxyalkylenepolyamine.

3. The composition according to claim 2 wherein said collective amounts of salicylic acid and N-(3-aminopropyl)piperazine are sufficient to provide in the range of about .1 to .25 part by weight for each part by weight of polyoxyalkylenepolyamine employed, wherein the salicylic acid is employed in amounts sufficient to provide in the range of about .3 to .4 part by weight salicylic acid for each part by weight N-(3-aminopropyl)piperazine, and wherein said polyepoxide is a polyglycidyl ether of bis(hydroxyphenyl)alkane.

4. The composition according to claim 2 wherein said phenol additive is selected from phenol, dinonylphenol, nonylphenol, chlorophenol, dichlorophenol, cresol, or hydroxyanisole, and wherein said epoxy resin is a diglycidyl ether of 2,2-bis(p-hydroxyphenyl)propane.

5. The cured epoxy resin of the composition of claim 1.

6. An epoxy resin accelerator-hardener composition consisting essentially of:
   (a) a polyoxyalkylenepolyamine;
   (b) N-(3-aminopropyl)piperazine;
   (c) salicylic acid; and
   (d) a phenol additive;
wherein said N-(3-aminopropyl)piperazine and said polyoxyalkylenepolyamine are collectively employed in such an amount to provide in the range of about .75 to 1.25 amino hydrogen equivalents for each epoxy equivalent provided by the epoxy resin, wherein the collective amounts of salicylic acid and N-(3-aminopropyl)piperazine are sufficient to provide in the range of about .02 to .5 part by weight for each part by weight of polyoxyalkylenepolyamine provided, wherein salicylic acid is employed in amounts sufficient to provide about .1 to 1 part by weight salicylic acid for each part by weight N-(3-aminopropyl)piperazine, and wherein said phenol additive is employed in an amount sufficient to provide in the range of about .05 to 1.25 hydroxyl equivalents for each amine equivalent collectively provided by said N-(3-aminopropyl)piperazine and said polyoxyalkylenepolyamine and wherein said phenol additive is represented by the following formula:

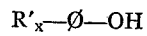

wherein each R' radical is independently selected from hydrogen, halogen, $C_1$ to $C_{20}$ alkyl or $C_1$ to $C_{20}$ alkoxy, and wherein $x$ is an integer of 1 to 3.

7. The composition according to claim 6 wherein said N-(3-aminopropyl)piperazine and said polyoxyalkylenepolyamine are collectively employed in such an amount to provide in the range of about .9 to 1.1 amino hydrogen equivalents for each epoxy equivalent provided by the epoxy resin, wherein the collective amounts of salicylic acid and N-(3-aminopropyl)piperazine are sufficient to provide in the range of about .05 to .3 part by weight for each part by weight of said polyoxyalkylenepolyamine employed, wherein the salicylic acid is employed in an amount sufficient to provide in the range of about .2 to .5 part by weight salicylic acid for each part by weight N-(3-aminopropyl)-piperazine, and wherein said phenol additive is employed in an amount sufficient to provide in the range of .1 to 1 hydroxyl equivalent for each amine equivalent provided by said N-(3-aminopropyl)piperazine and said polyoxyalkylenepolyamine.

8. The composition according to claim 6 wherein said N-(3-aminopropyl)piperazine and said polyoxyalkylenepolyamine are collectively employed in such an amount to provide about one amino hydrogen equivalent for each epoxy equivalent provided by the epoxy resin, wherein the collective amounts of salicylic acid and N-(3-aminopropyl)piperazine are sufficient to provide in the range of about .1 to .25 part by weight for each part by weight of polyoxyalkylenepolyamine provided, and wherein the salicylic acid is employed in an amount sufficient to provide in the range of about .3 to .4 part by weight salicylic acid for each part by weight N-(3-aminopropyl)piperazine, and wherein said phenol additive is nonylphenol.

9. The composition according to claim 6 wherein said phenol additive is selected from phenol, dinonylphenol, nonylphenol, chlorophenol, dichlorophenol, cresol, or hydroxyanisole.

10. A process for accelerating the cure of an epoxy resin comprising incorporating therein an effective amount of the accelerator-hardener curing composition of claim 6.

11. The process according to claim 10 wherein an effective amount of the accelerator-hardener curing composition of claim 8 is employed.

12. The process according to claim 10 wherein the accelerator-hardener curing composition of claim 9 is employed and wherein said epoxy resin comprises the diglycidyl ether of 2,2-bis-(p-hydroxyphenol)propane.

13. The process according to claim 10 wherein said phenol additive is incorporated with said epoxy resin prior to the incorporation of said polyoxyalkylenepolyamine, said N-(3-aminopropyl)piperazine and said salicylic acid.

References Cited
UNITED STATES PATENTS

| | | | |
|---|---|---|---|
| 2,965,609 | 12/1960 | Newey | 260—47 |
| 2,703,765 | 3/1955 | Osdal | 260—47 X |
| 3,306,809 | 2/1967 | Williamson et al. | 260—47 X |

WILLIAM H. SHORT, Primary Examiner

T. E. PERTILLA, Assistant Examiner

U.S. Cl. X.R.

117—169, 127; 252—182; 260—2 EC